(12) United States Patent
Niki et al.

(10) Patent No.: US 6,439,268 B2
(45) Date of Patent: Aug. 27, 2002

(54) FLUID-IMPERMEABLE COMPOSITE HOSE

(75) Inventors: Nobuaki Niki; Masanobu Ohnishi, both of Inuyama; Makoto Yoshino; Keiichi Kitamura, both of Kariya, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/810,567

(22) Filed: Mar. 19, 2001

(30) Foreign Application Priority Data

Mar. 21, 2000 (JP) ......................................... 2000-083213

(51) Int. Cl.⁷ ............................................... F16L 11/08
(52) U.S. Cl. ....................... 138/126; 138/137; 138/141; 138/DIG. 10
(58) Field of Search ................................ 138/123–126, 138/137, 141, 140, 143, DIG. 1, DIG. 7, DIG. 10

(56) References Cited

U.S. PATENT DOCUMENTS

| 4,510,974 A | 4/1985 | Natori et al. ............... 138/137 |
| 4,903,735 A | 2/1990 | Delacour et al. ............ 138/133 |
| 5,360,037 A | 11/1994 | Lindström .................. 138/138 |
| 5,398,729 A | 3/1995 | Spurgat ...................... 138/133 |
| 6,024,135 A | 2/2000 | Nobileau .................... 138/134 |
| 6,213,155 B1 | 4/2001 | Furuta et al. ................ 138/123 |

FOREIGN PATENT DOCUMENTS

JP          11 264488          9/1999

*Primary Examiner*—Patrick Brinson
(74) *Attorney, Agent, or Firm*—Jacobson Holman, PLLC

(57) ABSTRACT

A fluid-impermeable composite hose has a laminated layer composed of an inner winding layer formed by winding a laminated sheet spirally in a single layer, leaving a gap between every two adjoining turns, and an outer winding layer formed by winding a laminated sheet spirally in a single layer over the gap in the inner winding layer, leaving a gap between every two adjoining turns. The gap of the inner wind layer gives the hose flexibility and prevents the folding of the spirally wound sheet which might result in the failure of the hose to maintain its fluid impermeability.

19 Claims, 4 Drawing Sheets

PRIOR ART

FLUID-IMPERMEABLE COMPOSITE HOSE

BACKGROUND OF THE INVENTION

1. Field of the Invention

This invention relates to a fluid-impermeable composite hose. More particularly, it relates to a fluid-impermeable hose having a composite wall including a fluid-impermeable laminated layer formed of a laminated sheet which contains a metallic foil, or a metallic layer formed by vapor deposition. The hose of this invention is particularly useful as a fluid-impermeable hose for transporting any of various kinds of fluids in a motor vehicle.

2. Description of the Related Art

It is strongly desired in view of system maintenance, environmental protection, etc. that every hose used for transporting a refrigerant, such as carbon dioxide, in an air-conditioning system on a motor vehicle be impermeable to the refrigerant. One of the most effective approaches lies in a hose having a laminated wall layer which contains a metallic foil, or a metallic layer formed by vapor deposition. Environmental protection also requires a fuel hose to be impermeable to fuel, and a laminated wall layer is very useful for a fuel hose, too.

It has hitherto been usual to form a laminated wall layer for a hose by the longitudinal lapping or spiral winding of a tape of a laminated sheet containing a metallic foil, or a metallic layer formed by vapor deposition. Longitudinal lapping is a method in which a tape of a laminated sheet having a width large enough to encircle a hose to be made is placed in parallel to the longitudinal axis of the hose and bent into a cylindrical layer. Spiral winding is a method in which a tape of a laminated sheet is wound spirally to form a cylindrical layer.

Spiral winding is preferred to ensure that a hose installed on a motor vehicle be flexible enough to withstand any vibration of the vehicle or its engine. A spirally wound laminated sheet usually has a pair of spirally extending edge portions overlapping each other to ensure the formation of a laminated layer of high fluid impermeability. Such a way of spiral winding, however, presents a serious problem as is illustrated in a somewhat exaggerated way in FIG. 1. While no problem may occur to a first turn 1a of a spirally wound sheet 1, a second turn 1b thereof wound in a partly overlapping way has a loose edge portion 3 raised above the first turn 1a by a rear edge 2 thereof. The looseness of the raised edge portion 3 is gradually accumulated with an increase of spiral turns until it eventually becomes folded to absorb its looseness. The folds formed on the laminated layer at certain intervals lower the fluid impermeability of the hose seriously.

A thin and stretchable tape can usually be wound spirally about a cylindrical body without having either edge thereof raised, since it is curved into an S-shaped form across its width, as shown at 4 in FIG. 2. The laminated sheet under discussion, however, necessarily has a somewhat larger thickness, insofar as it has a multilayer structure in which a metallic foil, or a metallic layer formed by vapor deposition is interposed between a pair of resin films. Its stretchability has to be low enough to avoid the fracture of e.g. the foil by stretching. Therefore, the laminated sheet is difficult to wind spirally as shown in FIG. 2, and can only be wound as shown in FIG. 1.

SUMMARY OF THE INVENTION

It is an object of this invention to provide a fluid-impermeable composite hose having a laminated layer formed by winding a tape of a laminated sheet spirally, which is satisfactorily high in flexibility and is free from the problem as pointed out above.

The inventors of this invention have conceived of forming a laminated layer by winding a tape of a laminated sheet spirally in a way leaving a gap between every two adjoining turns, and winding a further tape spirally over such a gap. The laminated layer has overlapping portions as required, while giving the hose the necessary flexibility. Moreover, it is not folded as shown in FIG. 2.

According to a first aspect of this invention, there is provided a fluid-impermeable composite hose having a wall comprising a fluid-impermeable laminated layer formed of a laminated sheet which contains a metallic foil, or a metallic layer formed by vapor deposition, wherein the laminated layer comprises an inner winding layer formed by winding a tape of the laminated sheet spirally in a single layer and leaving a gap between every two adjoining turns, and an outer winding layer formed by winding another tape of the laminated sheet spirally in a single layer over the gap in the inner winding layer and leaving a gap between every two adjoining turns.

The inner winding layer 6 is a single spirally wound layer having a gap 6a between every two adjoining turns, as shown in FIG. 3. Therefore, it does not have any loosely raised edge portion of the nature mentioned before in connection with the related art. It does not form any fold which may lower the fluid impermeability of the hose seriously. The outer winding layer 7 does not form any such fold, either, since it is also a single spirally wound layer having a gap between every two adjoining turns.

The gap 6a in the inner winding layer does not affect the fluid impermeability of the hose at all, since it is covered by the outer winding layer 7. The gap 6a improves the flexibility of the hose, since it provides a space allowing for the bending of a cylindrical base 8, which may, for example, be a rubber layer. Although the laminated layer is formed of two winding layers, the hose is comparable in flexibility to any known hose having a single spirally wound laminated layer, since the gap 6a remains as it is after the winding of the outer layer, as shown in FIG. 3.

According to a second aspect of this invention, the gap in the inner winding layer has the maximum possible width, and is covered by the outer winding layer overlapping the inner winding layer appropriately. The maximum possible width of the gap 6a ensures the still higher flexibility of the hose.

According to a third aspect of this invention, the gap in the inner winding layer has a width of at least 1 mm. Although the width of the gap may depend on the flexibility as required of the hose and the width of the laminated sheet employed for the inner and outer winding layers, it provides a preferable example of a width of the gap.

According to a fourth aspect of this invention, the laminated sheet comprises one of the following (1) to (3) and a resin film or films laminated thereon:

(1) a metallic foil;
(2) a metallic foil with a reinforcing material; and
(3) a metallic layer formed by vapor deposition.

The laminated sheet containing (1) or (3) has the advantage of being relatively small in thickness, while the sheet containing (2) has the advantage that its foil is reinforced against fracture.

According to a fifth aspect of this invention, the laminated sheet satisfies at least one of the following requirements (4) to (6):

(4) it has a thickness not exceeding 250 μm;

(5) it contains a film or films of a polyamide (PA), polyethylene terephthalate (PET), or ethylene-vinyl alcohol (EVOH) resin; and (6) the resin film or films are of a material having an flexural modulus of at least 300 MPa.

These requirements make it possible to ensure the flexibility of the hose. These resins are all high in flexibility and tensile strength. A resin having a high flexural modulus gives the laminated sheet flexibility without giving it stretchability.

According to a sixth aspect of this invention, the inner and outer winding layers are bonded to each other in their overlapping portions. The hose has a still higher level of fluid impermeability.

According to a seventh aspect of this invention, the wall of the hose comprises one of the following layer combinations (7) to (10), each sequentially from the radially innermost layer:

(7) an inner rubber layer/the laminated layer/an intermediate rubber layer/a reinforcing layer/an outer rubber layer;

(8) a thin resin layer/an intermediate rubber layer/the laminated layer/an intermediate rubber layer/a reinforcing layer/an outer rubber layer;

(9) a thin resin layer/the laminated layer/a thin resin layer/an intermediate rubber layer/a reinforcing layer/an outer rubber layer; and

(10) an inner rubber layer/a thin resin layer/the laminated layer/a thin resin layer/an intermediate rubber layer/a reinforcing layer/an outer rubber layer.

These are a few typical examples of layer combinations for the wall of the hose according to this invention.

The above and other features and advantages of this invention will become more apparent from the following description and the accompanying drawings.

DETAILED DESCRIPTION OF THE INVENTION

Uses of Hoses:

The fluid-impermeable composite hose of this invention can be used for transporting various kinds of fluids, particularly a refrigerant, or fuel in, among others, a motor vehicle.

Wall Construction of Hoses:

The fluid-impermeable composite hose of this invention comprises in its wall a laminated layer formed of a spirally wound inner layer of a laminated sheet which contains a metallic foil, or a metallic layer formed by vapor deposition, and a spirally wound outer layer thereof. It may or may not have another layer or layers. The laminated layer may be employed in any position relative to the remaining layer or layers, and may, for example, be employed as an inner or intermediate layer.

Typical examples of layer combinations for the wall of a hose have been shown at (7) to (10) according to the seventh aspect of this invention. The hose having a wall as shown at (7) is suitable as, for example, a fuel hose. The wall as shown at (8) or (9) is characterized by having a thin resin layer as its innermost layer. The hose having a wall as shown at (9) or (10) has its laminated layer held and protected by and between two thin resin layers, so that, for example, the metallic foil may be particularly strong against fracture. The hose having a wall as shown at (8), (9) or (10) is particularly suitable as a hose for transporting a refrigerant, particularly carbon dioxide.

Laminated Layer:

The laminated layer is composed of an inner winding layer formed by winding spirally a laminated sheet containing a metallic foil, or a metallic layer formed by vapor deposition, and an outer winding layer formed by winding a similar sheet spirally about the inner winding layer.

Figure 1:
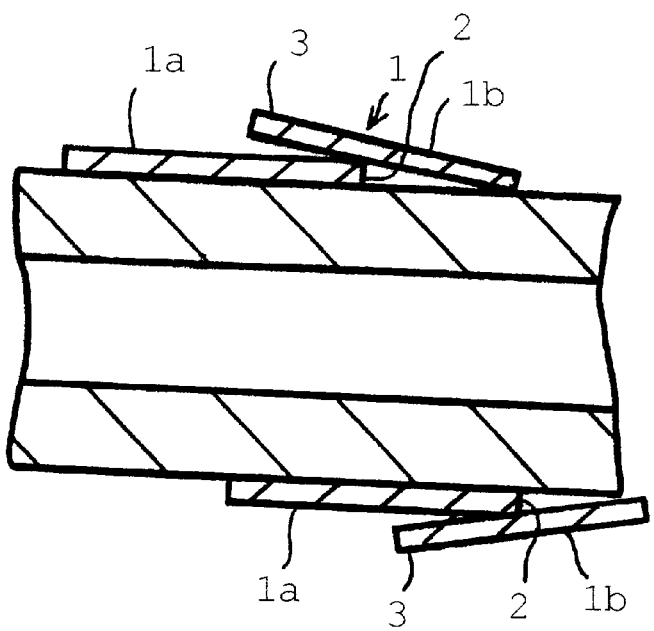
FIG. 1 shows a layer formed by winding a known laminated sheet spirally.
Figure 2:
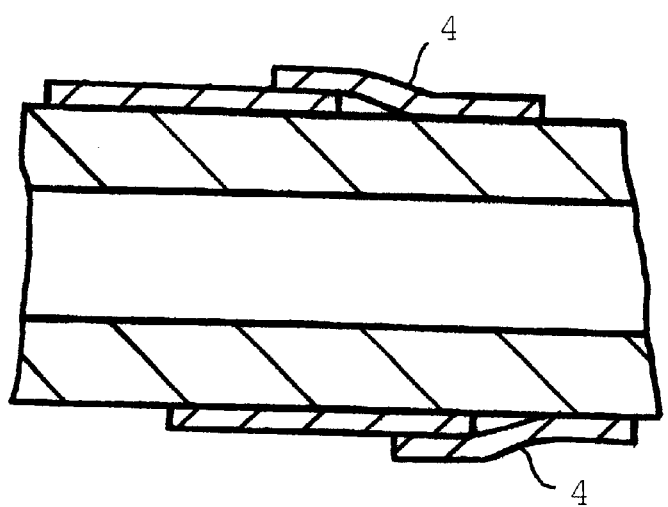
FIG. 2 shows a layer formed by winding a thin and stretchable tape spirally.
Figure 3:
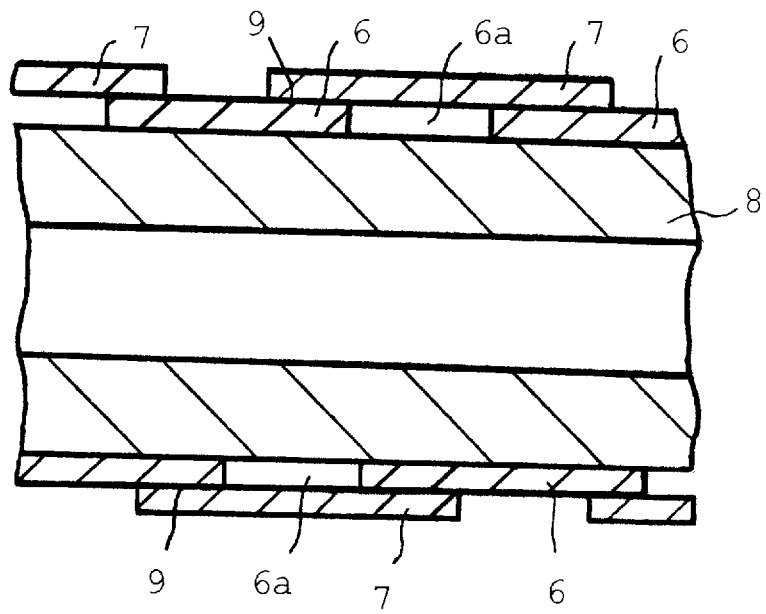
FIG. 3 shows a laminated layer formed by winding laminated sheets spirally according to this invention.
Figure 4A:
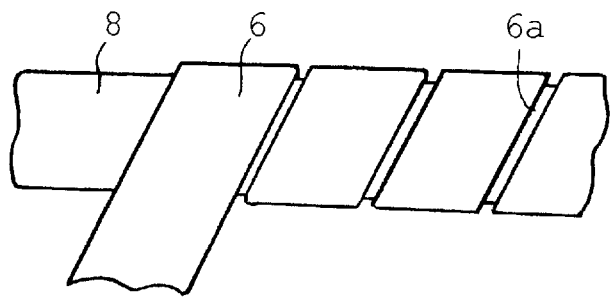
FIG. 4A shows an inner winding layer spirally wound according to the present invention.
Figure 4B:
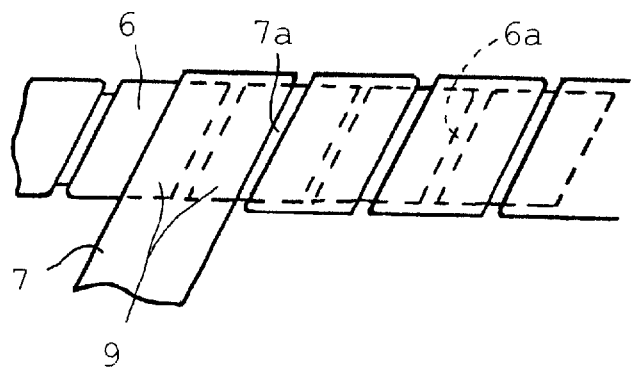
FIG. 4B shows an outer winding layer.

The inner winding layer is formed by winding a tape of a laminated sheet 6 spirally in a single layer about e.g. an inner rubber layer or a resin layer, in a manner to leave a spiral gap 6a between every two adjoining turns, as shown in FIG. 3 or 4A. The outer winding layer is formed by winding a tape of a laminated sheet 7 spirally in a single layer over the gap 6a in the inner winding layer 6, as shown in FIG. 4B. The outer winding layer overlaps the inner winding layer in their edge portions 9 and covers the gap 6a. The outer winding layer also has a spiral gap 7a. Thus, the laminated sheets 6 and 7 forming the inner and outer winding layers, respectively, are wound in the same direction with the same pitch, but with a difference in phase. The sheets may or may not be of the same width.

The gap 6a in the inner winding layer preferably has the maximum possible width that allows the outer winding layer to maintain an appropriate width in their overlapping edge portions 9, so that the hose may be of high flexibility. More specifically, it is preferable for the gap 6a to have a width of, say, at least 1 mm, while each overlapping edge portion 9 has a width of, say, 10 mm. The gap 7a in the outer winding layer may be of any adequate width, since it is intended merely for avoiding any overlapping in the outer winding layer.

The inner and outer winding layers are preferably bonded to each other in their overlapping edge portions 9 by, for example, using an adhesive, interposing an adhesive layer, or welding them directly under heat.

Laminated Sheet:

The laminated sheet used to form the inner or outer winding layer may be of any kind if it is in the form of a tape containing a metallic foil, or a metallic layer formed by vapor deposition. However, it preferably comprises a metallic foil, a combination of a metallic foil and a reinforcing material, or a metallic layer formed by vapor deposition, and a resin film or films laminated thereon.

A laminated sheet containing a metallic foil or a metallic layer formed by vapor deposition is usually made by placing the foil or layer between two resin films and welding or otherwise bonding the films to each other. A laminated sheet containing a metallic layer formed by vapor deposition can be made by forming such a layer on one side of a resin film and welding or otherwise bonding another resin film to that side. A laminated sheet may also be made by forming a metallic layer by vapor deposition on each of two resin films and welding or otherwise bonding the films to each other in such a way that the metallic layers may join each other.

In a combination of a metallic foil and a reinforcing material, the reinforcing material is preferably bonded to the foil to produce a higher reinforcing effect. The reinforcing material is preferably situated radially outwardly of the foil when the laminated sheet is spirally wound. The foil and reinforcing material may or may not be bonded to a resin film. While any kind of reinforcing material may be used, preferred examples are a wire mesh and a reinforcing cloth because of their high stretch resistance and flexibility. Examples of the reinforcing cloths include a canvas and a nonwoven fabric, preferably made from aramid, carbon, glass or like fibers of low stretchability. A resin film of high strength can also be used as the reinforcing material.

The hardness of the laminated sheet affects the flexibility of the hose. Accordingly, the resin films to be used are preferably of a resin having a flexural modulus of at least 300 MPa, such as PA, PET or EVOH. The films of any such resin are also preferred for avoiding the fracture of the metallic foil or layer in the laminated sheet, since it has a high stretch resistance.

The thickness of the resin films is another important factor affecting the flexibility of the hose, and is preferably, say, from 5 to 100 $\mu$m. If their thickness is too large, the laminated sheet is difficult to wind spirally, and there is obtained only a hose of low flexibility. It is also important for the laminated sheet as a whole to have a thickness not exceeding 250 $\mu$m to ensure the flexibility of the hose.

Thin Resin Layer:

A resin layer in the form of a thin film may be formed inwardly of the laminated layer, or inwardly and outwardly thereof. The resin layer formed inwardly of the laminated layer improves the impermeability of the hose to a refrigerant, etc. The resin layers formed both inwardly and outwardly secure and protect the laminated layer in a sandwiched form therebetween, as well as improving the fluid impermeability of the hose. The resin layer (or layers) is preferably of, for example, EVOH, PA or a mixture of PA and a modified polyolefin, and has a thickness not exceeding, say, 300 $\mu$m.

Intermediate Rubber Layer:

The intermediate rubber layer (or layers) serves to reduce or absorb any bending or deforming force acting upon the hose, so that no such force may reach the laminated layer, thereby protecting the metallic foil or layer. The intermediate rubber layer is preferably of a rubber material which is highly impermeable to a refrigerant, etc., flexible, and easy to bond at a high temperature to the laminated, or reinforcing layer. Preferred examples include butyl rubber (IIR), halogenated IIR, ethylene-propylene rubber, ethylene-propylene-diene rubber (EPDM), nitrile rubber (NBR) and epichlorohydrin rubber (ECO). It preferably has a thickness of, say, 0.2 to 1.5 mm.

Reinforcing Layer:

The hose preferably has a reinforcing layer in its wall. The reinforcing layer may, for example, be a braided wire layer, or a layer formed by braiding reinforcing yarn, or winding reinforcing yarn spirally or in two spiral layers extending in the opposite directions, or placing an intermediate rubber layer between two such spiral layers.

Outer Rubber Layer:

An outer rubber layer may form the outermost wall layer of the hose. It may be of any rubber of high weatherability, such as chloroprene rubber (CR), IIR, chlorosulfonated polyethylene rubber (CSM), EPDM or ECO.

DESCRIPTION OF THE PREFERRED EMBODIMENTS

Figure 5:
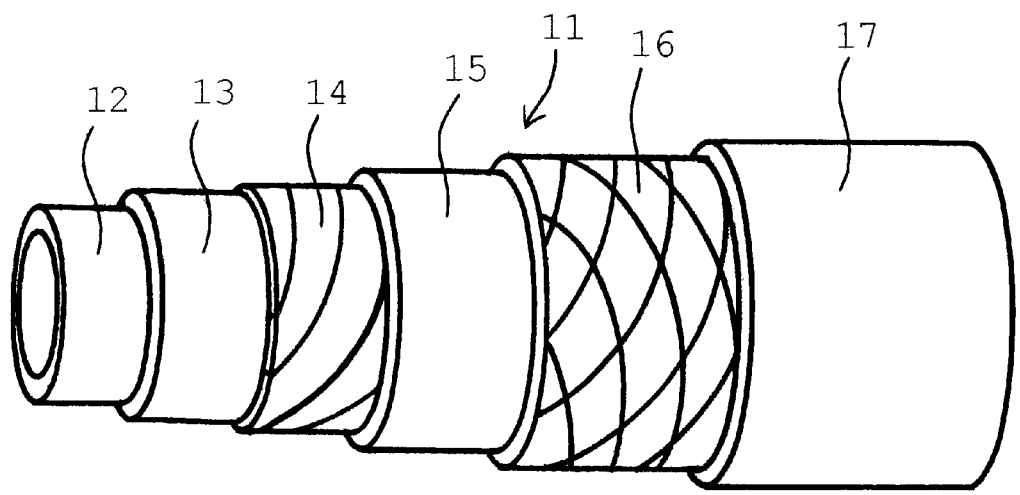
FIG. 5 is a partly cutaway perspective view of a hose embodying this invention.

Referring first to FIG. 5, a fluid-impermeable composite hose 11 has a resin layer 12 as the innermost layer of its wall and a first intermediate rubber layer 13 formed about it from IIR. The intermediate rubber layer 13 is surrounded by a laminated layer 14 composed of an inner and an outer winding layer formed by winding laminated sheets spirally, though not clearly shown. The laminated layer 14 is surrounded by a second intermediate rubber layer 15 formed from IIR and the layer 15 is surrounded by a reinforcing layer 16 formed by braiding an appropriate reinforcing yarn. The reinforcing layer 16 is surrounded by an outer rubber layer 17 formed from EPDM.

Figure 6:
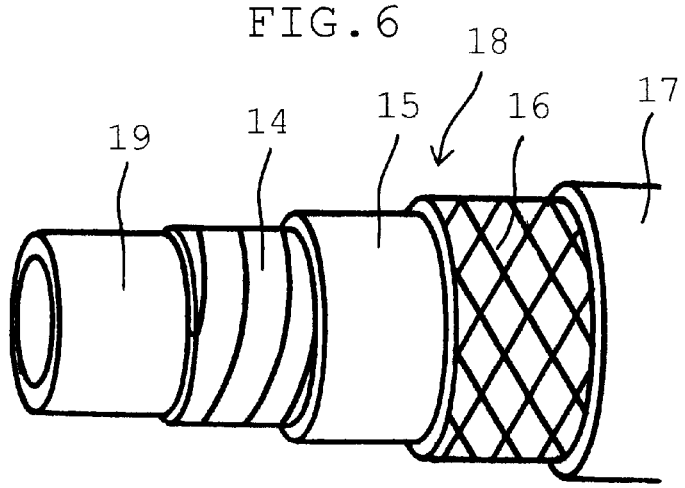
FIG. 6 shows another example of a hose embodying this invention.

FIG. 6 shows a hose 18 having an inner rubber layer 19 formed from IIR as the innermost layer of its wall and surrounded by a laminated layer 14, an intermediate rubber layer 15, a reinforcing layer 16 and an outer rubber layer 17 similarly to the layers 14 to 17 as described with reference to FIG. 5.

Figure 7A:
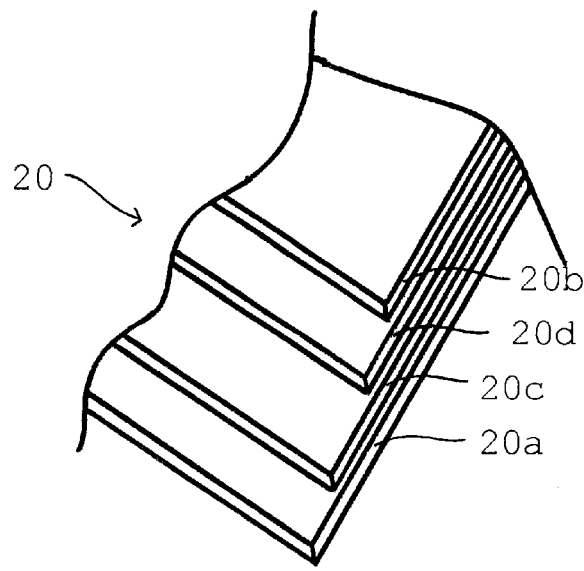
FIG. 7A is a fragmentary perspective view of a laminated sheet embodying this invention.
Figure 7B:
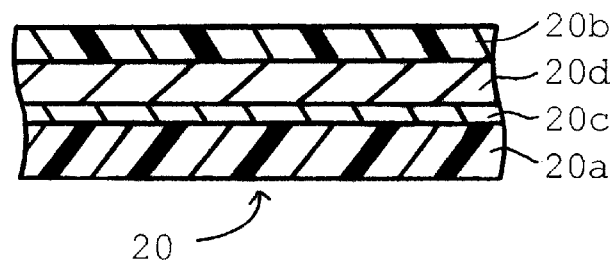
FIG. 7B is a cross sectional view of the sheet shown in FIG. 7A.

The laminated sheet used to form the laminated layer 14 for the hose shown in FIG. 5 or 6 has a laminated structure as shown in FIGS. 7A and 7B. The laminated sheet 20 is composed of an inner resin layer 20a formed of a thin film of a thermoplastic PET resin, a similar outer resin layer 20b, and a combination of an aluminum foil 20c and a resin sheet as a reinforcing material 20d which are sandwiched between the inner and outer resin layers 20a and 20b. The foil 20c is bonded to the reinforcing material 20d with an adhesive not shown, so that no tensile force acting upon the laminated sheet 20 may act upon the foil 20c.

Figure 7C:
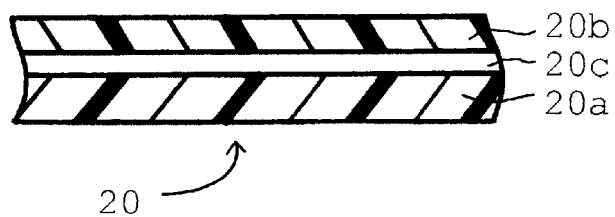
FIG. 7C is a cross sectional view of another example of a laminated sheet embodying this invention.

A modified form of laminated sheet 20 is shown in FIG. 7C. It has no reinforcing material as shown at 20d in FIG. 7B, but has a metallic foil 20c bonded between an inner resin layer 20a and an outer resin layer 20b.

While the invention has been described by way of its preferred embodiments, it is to be understood that variations or modifications may be easily made by those skilled in the art without departing from the scope of this invention which is defined by the appended claims.

What is claimed is:

1. A fluid-impermeable composite hose having a wall comprising a fluid-impermeable laminated layer formed of a laminated sheet which contains a metallic foil, or a metallic layer formed by vapor deposition, wherein the laminated layer comprises an inner winding layer formed by winding a tape of the laminated sheet spirally in a single layer and leaving a gap between every two adjoining turns, and an outer winding layer formed by winding another tape of the laminated sheet spirally in a single layer over the gap in the inner winding layer and leaving a gap between every two adjoining turns.

2. The hose according to claim 1, wherein the gap in the inner winding layer has the maximum possible width, and is covered by the outer winding layer overlapping the inner winding layer.

3. The hose according to claim 1, wherein the gap in the inner winding layer has a width of at least 1 mm.

4. The hose according to claim 2, wherein the inner and outer winding layers are bonded to each other in their overlapping portions.

5. The hose according to claim 1, wherein the laminated sheet comprises one of the following (1) to (3), and a resin film or films laminated thereon:

(1) a metallic foil;
(2) a combination of a metallic foil and a reinforcing material; and
(3) a metallic layer formed by vapor deposition.

6. The hose according to claim 5, wherein the laminated sheet includes two resin films between which the foil, the foil with a reinforcing material, or the metallic layer is held.

7. The hose according to claim 5, wherein the foil and the reinforcing material are bonded to each other.

8. The hose according to claim 7, wherein the reinforcing material is a wire mesh or a reinforcing cloth.

9. The hose according to claim 5, wherein the laminated sheet includes two resin films, and the metallic layer is formed on one side of one of the resin films, while the other resin film lies on that side.

10. The hose according to claim 5, wherein the laminated sheet includes two resin films, and the metallic layer is formed on each of the resin films, the resin films being welded or bonded to each other in such a way that the metallic layers thereon may join each other.

11. The hose according to claim 5, wherein the resin film is of a resin having a flexural modulus of at least 300 MPa.

12. The hose according to claim 5, wherein the resin film is of a polyamide, polyethylene terephthalate, or ethylene-vinyl alcohol resin.

13. The hose according to claim 5, wherein the resin film has a thickness of 5 to 100 $\mu$m.

14. The hose according to claim 1, wherein the laminated sheet has a thickness of 250 $\mu$m at maximum.

15. The hose according to claim 1, wherein the wall sequentially comprises an inner rubber layer, the laminated layer, an intermediate rubber layer, a reinforcing layer and an outer rubber layer.

16. The hose according to claim 1, wherein the wall sequentially comprises a thin resin layer, an intermediate rubber layer, the laminated layer, an intermediate rubber layer, a reinforcing layer and an outer rubber layer.

17. The hose according to claim 1, wherein the wall sequentially comprises a thin resin layer, the laminated layer, a thin resin layer, an intermediate rubber layer, a reinforcing layer and an outer rubber layer.

18. The hose according to claim 1, wherein the wall sequentially comprises an inner rubber layer, a thin resin layer, the laminated layer, a thin resin layer, an intermediate rubber layer, a reinforcing layer and an outer rubber layer.

19. The hose according to claim 1 adapted to be used for transporting a refrigerant in a motor vehicle.

* * * * *